UNITED STATES PATENT OFFICE.

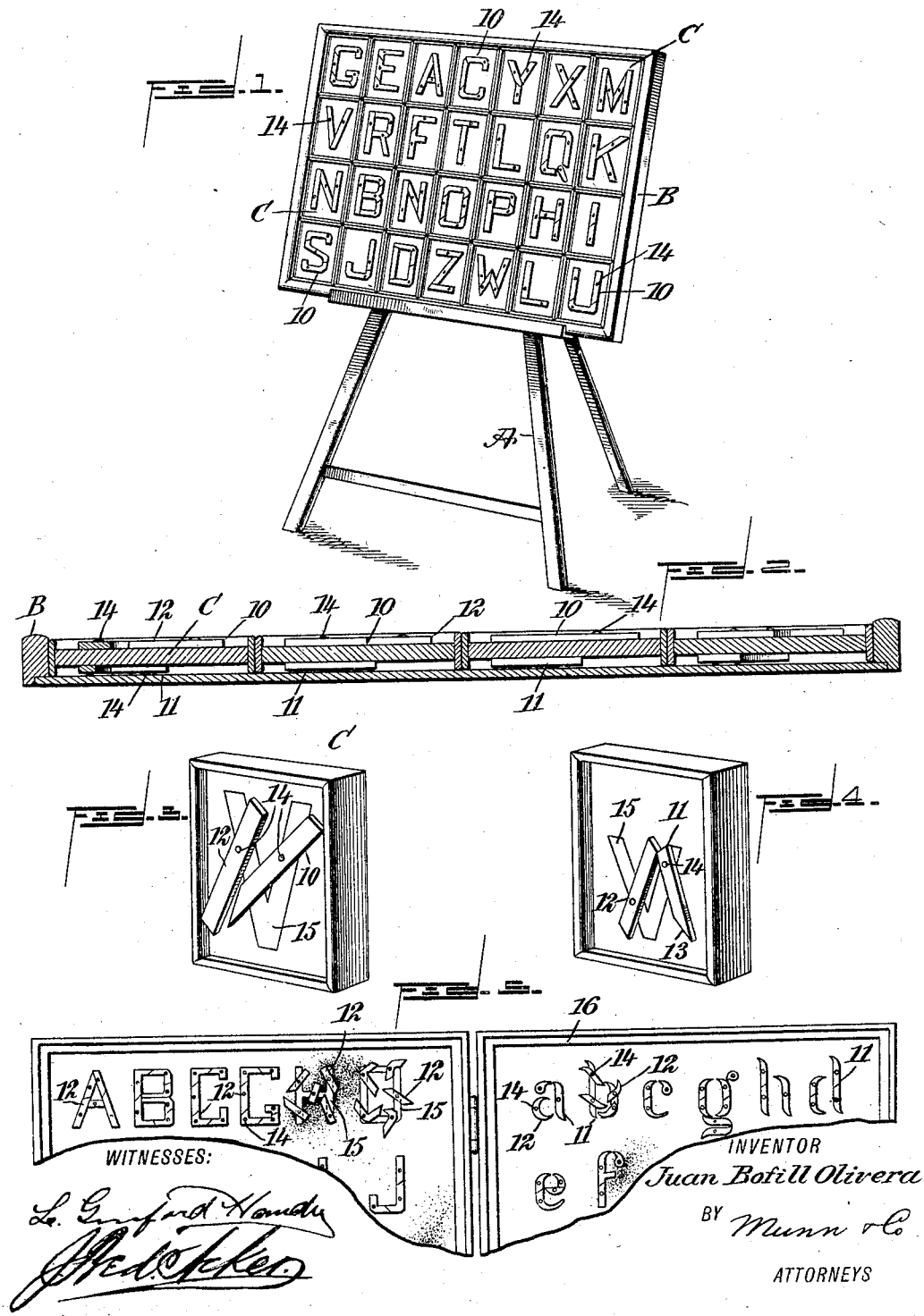

JUAN BOFILL OLIVERA, OF MATANZAS, CUBA.

EDUCATIONAL DEVICE.

No. 795,855.  Specification of Letters Patent.  Patented Aug. 1, 1905.

Application filed August 3, 1904. Serial No. 219,318.

*To all whom it may concern:*

Be it known that I, JUAN BOFILL OLIVERA, a citizen of the Republic of Cuba, and a resident of Matanzas, in the Province of Matanzas, Cuba, have invented a new and Improved Educational Device, of which the following is a full, clear, and exact description.

The purpose of my invention is to provide letters which are in pivotally-supported sections capable of being brought together to produce the full form of a letter or of being separated or disarranged, so that they will necessarily have to be reassembled.

Another purpose of the invention is to provide a means whereby children may be quickly and readily instructed as to the outlines of capital and small letters, Roman or in script, the letters, as stated, being in pivoted sections, and to provide in connection with the said pivoted sections of a letter an outlined letter on the support, so that when the sections have been moved promiscuously they can be assembled on the outlined letter which serves as a guide, thus giving employment to the young student and impressing the character of the letter on the mind.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of a frame and blocks in the frame having sectional letters produced thereon and an easel supporting the said frame. Fig. 2 is a horizontal section taken through the frame and the blocks shown in Fig. 1. Fig. 3 is a perspective view of one of the blocks, illustrating one of the capital sectional letters thereon disarranged. Fig. 4 is a view similar to Fig. 3, but showing the reverse side of the block shown in Fig. 3, whereon a small corresponding letter is produced and the sections adapted to form this small letter are likewise shown out of proper place; and Fig. 5 is a plan view of a portion of a book, illustrating the alphabet produced in sections on the pages of the book in capitals and in small letters.

A represents an easel, upon which the frame B is supported, adapted to be used in explaining the letters of the alphabet and their formation to a class. This frame is adapted to receive blocks C, corresponding in number to the number of letters in the alphabet. Each block C is provided upon one face with separable capital letters 10 and upon the other face with separable small letters 11, and said letters may be produced in block or Roman characters or in Italics or in script.

The letters, no matter what their character may be, are made in sections 12, the ends 13 of the said sections being beveled or straight, as may be demanded in the formation of a complete letter after the sections of the letter have been so separated that said sections in no manner show the correct outlines of a letter, but which sections, when properly assembled, portray the intended letter. Each section 12 of a letter is pivoted to a block C by means of a pivot-pin 14, so located as to enable the sections to be conveniently manipulated when the sections are to be separated and to produce a perfect jointure when the sections are assembled. Each block has an outline or an imprint 15 of the letter to be formed produced thereon, and the sections of the sectional letters corresponding to the said imprint or outline 15 are so pivoted that when said sections are properly assembled the connected sections of a letter will cover the imprint, which is employed as a guide for the person learning the formation of a letter.

The sections of the letters are usually made of thin metal; but celluloid or other appropriate material may be used.

In Fig. 5 I have illustrated the sectional letters applied directly to the pages of a book 16, the capital letters being on one page and the corresponding small letters upon the next page. This book is intended for the pupil, and the guiding outlines or imprints of the letters, although shown, may be omitted, and the pupil thus be compelled to rely upon his memory or idea of the formation of the letter demonstrated by the instructor.

I desire it to be understood that numerals and characters may be produced in the same manner as the letters described.

Having thus described my invention, I claim as new and desire to secure by Letters Patent—

1. In an educational device, a block, and a sectional letter on the block, which letter is a fixture and is constructed in sections independent of each other and pivotally sustained on the block, whereby the sections of the letter are capable of separation and assemblage.

2. In an educational device, a support having a character outlined thereon and a corresponding character constructed in sections, which sections are pivotally mounted on the said outline, the sectional character being a fixture on the support for the purposes described.

3. In an educational device, a block having an outline of a capital letter on one face and an outline of a small letter on the opposite face, and a series of movable members which when properly assembled follow the outline of the letters produced on the two faces of the block, the said members being pivoted to the block, enabling them to be brought to position to conform to the outline of the letters on the block or to be carried away from the said outline to a certain extent.

In testimony whereof I have signed my name to this specification in the presence of two subscribing witnesses.

JUAN BOFILL OLIVERA.

Witnesses:
J. FRED. ACKER,
JNO. M. RITTER.